US008644984B2

(12) United States Patent
Nagatsuka et al.

(10) Patent No.: US 8,644,984 B2
(45) Date of Patent: Feb. 4, 2014

(54) ROBOT PROGRAMMING DEVICE FOR PALLETIZING OPERATION BY ROBOT

(75) Inventors: Yoshiharu Nagatsuka, Yamanashi (JP); Masahiro Oyamada, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 1281 days.

(21) Appl. No.: 12/191,764

(22) Filed: Aug. 14, 2008

(65) Prior Publication Data
US 2009/0069939 A1 Mar. 12, 2009

(30) Foreign Application Priority Data

Sep. 12, 2007 (JP) ................................. 2007-236902

(51) Int. Cl.
*B65G 65/00* (2006.01)
*G06F 19/00* (2011.01)
*B25J 9/16* (2006.01)

(52) U.S. Cl.
USPC ........... 700/217; 700/213; 700/214; 700/218; 700/230; 414/426; 414/788

(58) Field of Classification Search
None
See application file for complete search history.

(56) References Cited

U.S. PATENT DOCUMENTS

| 4,287,459 A | * | 9/1981 | Dahlstrom | 318/568.14 |
| 4,380,696 A | * | 4/1983 | Masaki | 219/124.34 |
| 4,419,384 A | * | 12/1983 | Kane et al. | 427/8 |
| 4,641,271 A | * | 2/1987 | Konishi et al. | 700/217 |
| 4,692,876 A | * | 9/1987 | Tenma et al. | 700/249 |
| 4,746,255 A | * | 5/1988 | Roccabianca et al. | 414/793.8 |
| 4,815,190 A | * | 3/1989 | Haba et al. | 29/430 |
| 4,871,252 A | * | 10/1989 | Beni et al. | 356/457 |
| RE33,416 E | * | 10/1990 | Konishi et al. | 700/217 |
| 4,969,109 A | * | 11/1990 | Mizuno et al. | 700/262 |
| 5,050,090 A | * | 9/1991 | Golub et al. | 700/217 |
| 5,175,692 A | * | 12/1992 | Mazouz et al. | 700/217 |
| 5,413,454 A | * | 5/1995 | Movsesian | 414/729 |
| 5,501,571 A | * | 3/1996 | Van Durrett et al. | 414/801 |

(Continued)

FOREIGN PATENT DOCUMENTS

| EP | 1026637 A2 | 8/2000 |
| JP | 07-237159 | 9/1995 |

(Continued)

OTHER PUBLICATIONS

Notice of Reasons for Rejection for JP2007-236902 mailed Jan. 6, 2009.

(Continued)

*Primary Examiner* — Bhavesh V Amin
(74) *Attorney, Agent, or Firm* — Lowe Hauptman & Ham, LLP

(57) ABSTRACT

A robot programming device capable of reducing the operation of a robot in the field required for generating a program for palletizing operation, and shortening a time to generate the palletizing program. The robot programming device includes a storing part for storing three-dimensional models of the plurality kinds of units, a conveyor, a recognition device, a robot and a plurality of pallets; a layout making part for making a layout, in a virtual space, of the three-dimensional models stored in the storing part; a displaying part for displaying the layout made by the layout making part; an information setting part for setting information regarding each component displayed on the displaying part; and a program generating part for generating a palletizing program for the robot based on the layout of the three-dimensional models and the information set by the information setting part.

8 Claims, 3 Drawing Sheets

(56) References Cited

U.S. PATENT DOCUMENTS

| | | | |
|---|---|---|---|
| 5,613,826 A * | 3/1997 | Scott | 414/802 |
| 5,908,283 A * | 6/1999 | Huang et al. | 414/801 |
| 6,120,241 A * | 9/2000 | Huang et al. | 414/801 |
| 6,286,656 B1 * | 9/2001 | Huang et al. | 198/502.2 |
| 6,699,007 B2 * | 3/2004 | Huang et al. | 414/801 |
| 6,721,762 B1 * | 4/2004 | Levine et al. | 1/1 |
| 7,092,860 B1 | 8/2006 | Wasserman | |
| 7,266,422 B1 * | 9/2007 | DeMotte et al. | 700/217 |
| 7,390,458 B2 * | 6/2008 | Burow et al. | 422/63 |
| 7,480,976 B2 * | 1/2009 | Reed et al. | 29/563 |
| 7,746,379 B2 * | 6/2010 | Jesson et al. | 348/161 |
| 2002/0106273 A1 * | 8/2002 | Huang et al. | 414/788.1 |
| 2002/0193972 A1 | 12/2002 | Kudo et al. | |
| 2005/0075752 A1 * | 4/2005 | Ban et al. | 700/213 |
| 2005/0201610 A1 * | 9/2005 | Hertzman et al. | 382/151 |

FOREIGN PATENT DOCUMENTS

| | | |
|---|---|---|
| JP | 7328968 A | 12/1995 |
| JP | 10-031742 | 2/1998 |
| JP | 11079407 A | 3/1999 |
| JP | 2921496 B2 | 4/1999 |
| JP | 3225725 B2 | 8/2001 |
| JP | 2001216015 A | 8/2001 |
| JP | 2005052926 A | 3/2005 |
| JP | 2006004262 A | 1/2006 |

OTHER PUBLICATIONS

Sorenti, Peter, "Rapid palletizing: simulation in the fast lane," Industrial Robot, vol. 23, No. 3, 1996, pp. 16-19.

SungJin Lim et al., "Robot Palletizing Simulation Using Heuristic Pattern Generation and Trajectory Optimization," SICE-ICASE International Joint Conference 2006, IEEE, Oct. 18-21, 2006 in Benco, Busan, Korea, pp. 2227-2232.

"Motoman's enhanced MOTOPALLET EG software makes programming palletizing jobs faster and easier," Motoman news release, Feb. 1, 2007, 1 page, XP-002669536.

EP Search Report for 08 01 4716 dated Feb. 20, 2012.

* cited by examiner

ROBOT PROGRAMMING DEVICE FOR PALLETIZING OPERATION BY ROBOT

RELATED APPLICATIONS

The present application claims priority from Japanese Patent Application No. 2007-236902, filed on Sep. 12, 2007, the entire content of which is fully incorporated herein by reference.

BACKGROUND OF THE INVENTION

1. Field of the Invention

The present invention relates to a robot programming device for generating a palletizing program used in a palletizing operation for sorting containers or packages by using a robot.

2. Description of the Related Art

A programming device for generating a palletizing program is used when a palletizing operation is carried out by using a robot. In the palletizing operation, a plurality of units on a conveyor are assorted and loaded on a pallet or the like according to category. For example, Japanese Unexamined Patent Publication No. 7-237159 discloses a load handling unit having a package status indicating device for displaying a packaging status of units to be handled and a position inputting device for directing the position of the indicated unit and inputting a way of restart operation of an industrial robot from the position of the unit.

Japanese Unexamined Patent Publication No. 10-31742 also discloses an unit conveying device and an image processor having a means for generating an image of a plurality of units, by which the three-dimensional position of an unit may be obtained in a short time by a simple constitution.

As a robot program for the palletizing operation, a program for a robot in the actual field for assorting units on a conveyor in a teaching playback system, is known. However, it takes a long time to prepare such a program. On the other hand, a technique using software for a personal computer (PC) is also known. The software is used for generating a robot program by which a robot may assort units on the conveyor. However, in this case, it is necessary to check the motion of a robot in the field by connecting the PC to the robot. As such, when the PC software is used and the program is downloaded by connecting the PC the robot in the field, it is necessary to operate the robot in the field in order to set reference positions of the conveyor and the pallet, etc.

SUMMARY OF THE INVENTION

Accordingly, it is an object of the present invention to provide a robot programming device capable of reducing the operation of a robot in the field required for generating a program for palletizing operation, and shortening a time to generate the palletizing program.

According to the present invention, there is provided a robot programming device for generating a palletizing program used in a palletizing system including a conveyor for conveying a plurality kinds of units; a recognition device to recognize a kind of each unit conveyed by the conveyor; a robot for assorting the units based on the kind of unit recognized by the recognition device; and a plurality of pallets to which the assorted units are loaded according to the kinds of the units, the robot programming device comprising: a storing part for storing three-dimensional models of the plurality kinds of units, the conveyor, the recognition device, the robot and the plurality of pallets; a layout making part for making a layout, in a virtual space, of the three-dimensional models stored in the storing part; a displaying part for displaying the layout made by the layout making part; an information setting part for setting information regarding each component displayed on the displaying part; and a program generating part for generating a palletizing program for the robot based on the layout of the three-dimensional models and the information set by the information setting part.

The robot programming device may further comprise a simulation executing part for executing a simulation based on the palletizing program generated by the program generating part. In this case, the simulation may be executed as a three-dimensional animation.

The robot programming device may further comprise a compression amount calculating part for calculating an amount of compression of stacked units in the vertical direction in this case, the program generating part may generate a program for automatically correcting the vertical position of the unit to be taken out.

The robot programming device may further comprise a vision sensor for measuring an amount of compression of stacked units in the vertical direction. In this case, the program generating part may generate a program for automatically correcting the vertical position of the unit to be taken out. In addition, the vision sensor for measuring the amount of compression of stacked units may be attached to a hand of a robot.

The information set by the information setting part may include at least one of: a kind of the unit detected by the recognition device, a stacking pattern of the units on the pallet, input/output information between the robot, the conveyor and the recognition device, and the shape and operational condition of a hand attached to the robot.

A preferable example of the recognition device is a switching device for switching the kind of unit on the conveyor, a non-contact sensor for detecting a RF tag attached to each unit, or a vision sensor.

BRIEF DESCRIPTION OF THE DRAWINGS

The above and other objects, features and advantages of the present invention will be made more apparent by the following description, of the preferred embodiments thereof, with reference to the accompanying drawings wherein.

DETAILED DESCRIPTIONS

Figure 1:
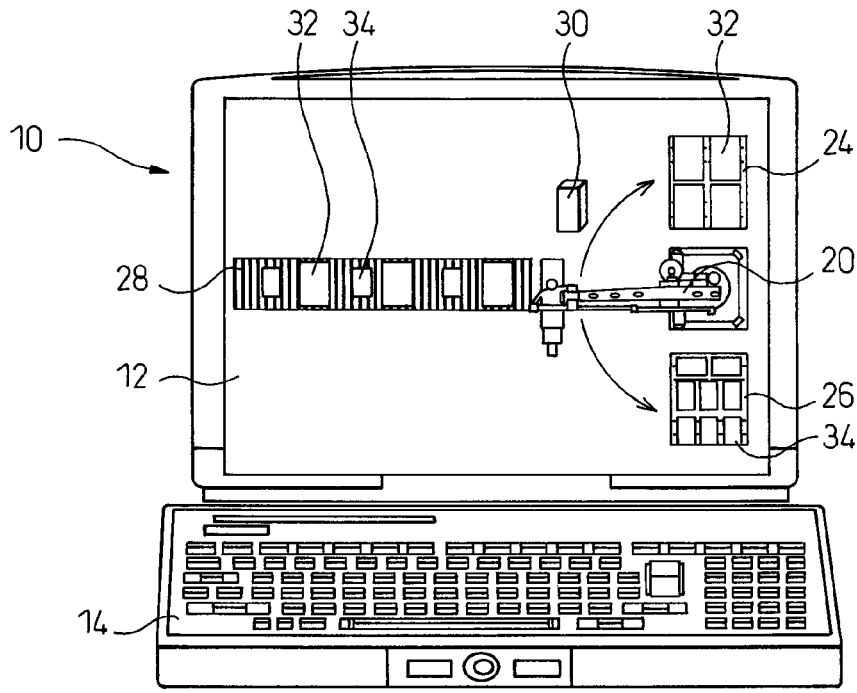
FIG. 1 shows one embodiment of a robot programming device according to the invention.

FIG. 1 shows one embodiment of a robot programming device according to the invention. The robot programming device is a personal computer (hereinafter, referred to as a PC) 10, for example, having a displaying part 12 such as a screen for displaying a layout of each component in a virtual space, and an inputting part 14 such as a keyboard for allowing an operator to input various commands or the like. Precise three-dimensional models of a robot and other components are stored in a memory of PC 10.

Figure 2:
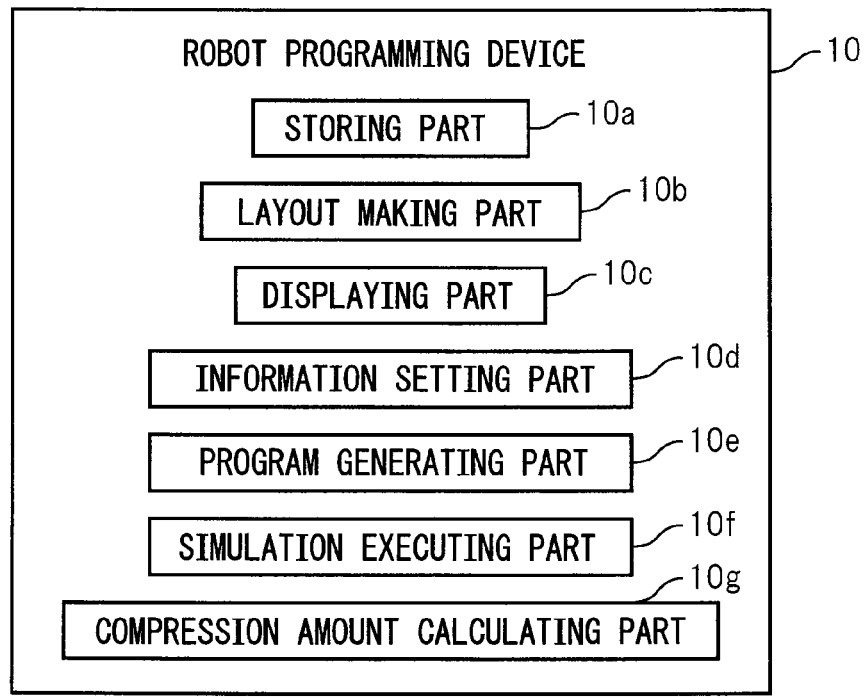
FIG. 2 is a basic configuration of the robot programming device of the invention.

FIG. 2 is a block diagram showing a basic configuration of the robot programming device. Robot programming device 10 has a storing part 10a for storing three-dimensional models of a plurality kinds of units, a conveyor, a recognition device, a robot and a plurality of pallets; a layout making part 10b for making a layout, in a virtual space, of the three-dimensional models stored in storing part 10a; a displaying part 10c for displaying the layout made by layout making part 10b; an information setting part 10d for setting information regarding each component displayed on displaying part 10c; and a program generating part 10e for generating a palletizing program for the robot based on the layout of the three-dimensional models and the information set by information setting part 10d. Robot programming device 10 may further have a simulation executing part 10f for executing a simulation based on the palletizing program generated by program generating part 10e, and a compression amount calculating part 10g for calculating an amount of compression of stacked units in the vertical direction. In the embodiment, a memory and a screen of PC 10 may serve as storing part 10a and displaying part 10c, respectively, and a processor such as a CPU of PC 10 may serve as the other elements of the programming device.

In the embodiment, an operation using a robot having an adsorption hand is simulated. In the operation, two different kinds of units (large and small units) are fed to one conveyor at random timing, and the robot picks up the units and loads them on two pallets according to the sizes of the units. In the field, a recognition device such as a vision sensor to recognize the kind of units on the conveyor is attached to the robot. The robot may recognize the kind of the unit capable of being picked from the conveyor based on a signal from the recognition device, and loads each unit on the pallet corresponding to the kind of the unit. According to the invention, as described below, such an operation may be correctly simulated by using the three-dimensional models, without operating an actual system.

Figure 3:
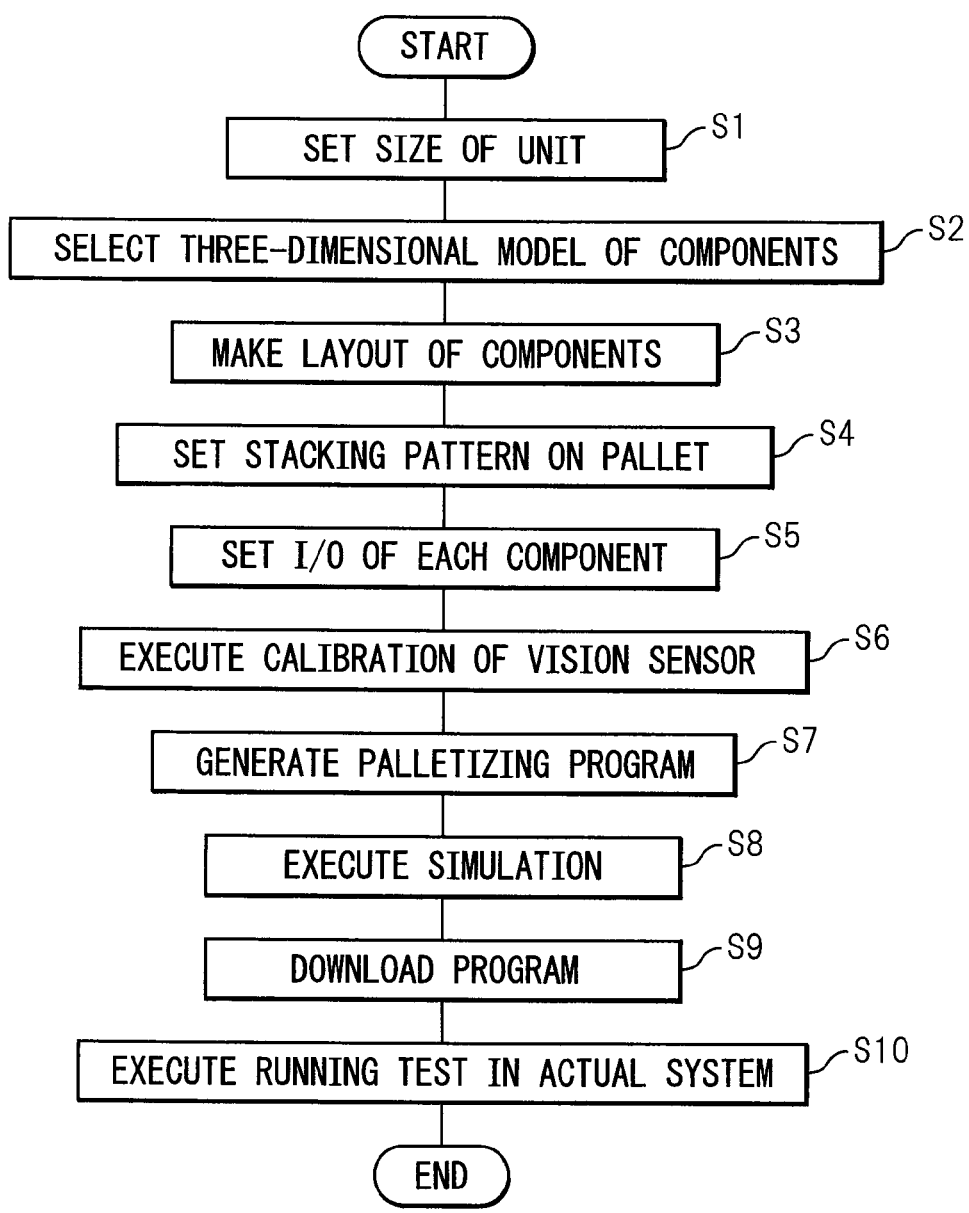
FIG. 3 is a flowchart showing a procedure of the robot programming device.

FIG. 3 is a flowchart showing a procedure of the robot programming device of the invention. First, in step S1, the sizes (e.g., the length, the width and the height) of two kinds of (large and small) units are set. Then, in step S2, the three-dimensional models of a robot, a hand, a conveyor, a pallet and a recognition device corresponding to the set unit are selected from models stored in the memory of the PC. Concretely, types of the robot for palletizing, the hand, the conveyor and the recognition device are selected; and a feeding speed of the conveyor, an arrival frequency of the units on the conveyor to a delivery position, the size and the position of each pallet are determined. In this connection, as the hand of the robot, an adsorption hand or a gripping hand driven by pneumatic pressure or a servomotor may be used. The size of the pallet may be adjusted corresponding to an actual pallet in the field.

Figure 4:
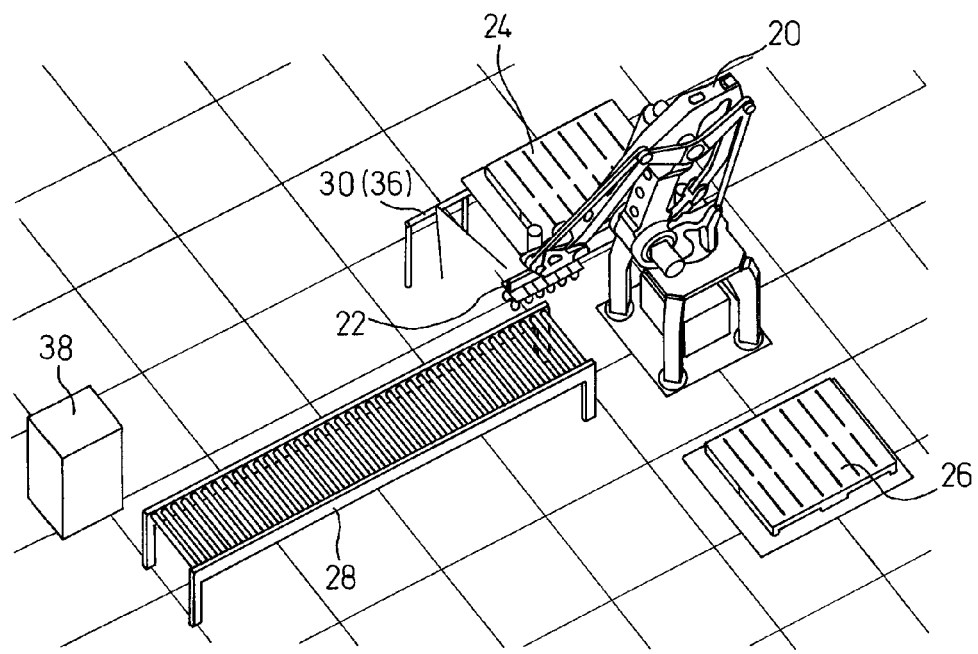
FIG. 4 shows one example of a layout of each component in a virtual space of the robot programming device.

In the next step S3, in the virtual space of the PC or the programming device, the selected three-dimensional CAD models of the robot, the hand, the conveyor, the pallet and the recognition device are positioned so as to make a layout thereof. FIG. 4 shows an example of the layout. In the layout, the origin of robot 20 is used and hand 22 is attached to robot 20 for determining the operation range of robot 20. Further, the orientation of robot 20 when the robot holds the unit is also determined. The operation range of the robot may be graphically indicated by the programming device. First and second pallets 24, 26 for large and small units and conveyor 28 are positioned such that the delivery position is within the operation range of robot 20. Vision sensor 30 as the recognition device to recognize the kind of the unit on the conveyor is positioned such that the sensor may be seen from the lateral side of the delivery position of conveyor 28.

The three-dimensional models such as robot 20 and hand 22, are formed similar to the actual corresponding components. Therefore, the operation range of the robot and interference between the three-dimensional models may be correctly checked by simulation. It is preferable that the three-dimensional models are precisely constituted corresponding to the actual components. However, it is necessary at least that the three-dimensional models are formed such that the normal operation of each component and interference between them may be previously checked. Generally, the type and the feeding speed of the conveyor and the arrival frequency of the units are determined based on the condition of the physical distribution system in the field. However, in the embodiment, it is assumed that the feeding speed is constant, the arrival frequency is not constant, and the conveyor is a conventional conveyor.

In the next step S4, a stacking pattern of the units on the pallet, prepared by the programming device, is set. In the embodiment, larger or first units 32 and smaller or second units 34 are conveyed by conveyor 28. Further, a stacking pattern of first units 32 is set to first pallet 24, and a stacking pattern of second units 34 is set to second pallet 26. The stacking pattern on the pallet may be specified by the Japanese Industrial Standard (JIS Z0111, etc.), for example, alternative-stacking and brick-stacking patterns may be set to the first and second units, respectively. Next, a stacking sequence for each layer of units on the pallet is set. In even-numbered layer (second, fourth, sixth, . . . , layers from the bottom), the staking pattern may be inverted from odd-numbered layer (first, third, fifth, . . . , layers from the bottom). The stacking sequence in this case is also set. The stacking pattern may be selected from a plurality of patterns previously prepared. Further, the stacking pattern may be inverted every other layer, and/or a stacking sequence in each layer may be arbitrarily set.

In the next step S5, an input-output signal or I/O between each component is set. Signals which are necessary to be set are explained below.

(a) Unit Arrival Signal

This signal is an on-off signal indicating that the unit is conveyed to the delivery position. Generally, the number of prepared channels for the signal is equal to the number of the kinds of units. Since the embodiment includes two kinds of units, unit arrival signals a1 and a2 are used.

(b) Pallet Location Signal

This signal is an on-off signal indicating that the pallet is located on a predetermined pallet position. When this signal is valid (on), the robot is moved to the pallet and stacks the units of the pallet. Since the embodiment includes two pallet positions, pallet location signals b1 and b2 are used.

(c) Operation Stop Signal

This signal is an on-off signal indicating whether the operation should be discontinued for some reasons. This signal is checked every when the operation for one unit is completed, and if the signal is valid (on), the robot is returned to its origin so as to discontinue the operation and the program is terminated.

(d) Skip Command Signal

This signal is an on-off signal indicating whether the operation of an unit handled when an error occurs in the system should be continued when the system is restarted after the occurrence of the error. The skip command signal is checked when the system is restarted after the occurrence of the error, and if the signal is valid (on), then the unit being handled is ignored and the next unit is picked.

(e) Pallet Replacing Signal

This signal is an on-off signal informing the robot that the pallet is being replaced. The pallet replacing signal is maintained at a valid (on) state until a replacement operation of the pallet is completed. Since the embodiment includes two pallet positions, pallet replacing signals e1 and e2 are used.

(f) Pallet Replacement Command Signal

This signal is a signal for commanding the replacement of the pallet. The pallet replacement command signal becomes a valid (on) state after a predetermined number of units are stacked on the pallet. Since the embodiment includes two pallets, pallet replacement command signals f1 and f2 are used.

(g) Unit Hold Check Signal

This signal is a signal for checking that the hand of the robot holds the unit. The unit grip check signal becomes a valid (on) state while the hand grips or adsorbs the unit.

Other than the above signals, a cardboard insertion command signal for commanding insertion of a cardboard between pallets, a cardboard inserting signal indicating that a cardboard is being inserted between the pallets, and a skip check signal for checking that a skip operation is executed based on the above skip command signal, may be used as the I/O signal.

In the next step S6, calibration of the vision sensor is executed. As shown in FIG. 4, vision sensor 30 is arranged such that the vision sensor detects or images the delivery position of conveyor 28 from lateral side thereof. Therefore, the vision sensor may identify the kind of each unit based on the size thereof. In addition, the vision sensor may transmit a signal to the robot after detecting the unit.

In the next step S7, a palletizing program for the robot is generated and output based on the above settings. The program may be divided into a plurality of programs. In this case, when a main program is executed, the other programs may be called from the main program. An example of the main program is indicated below.

1: check activation of recognition device, conveyor and external system

2: execute main program

3: set number of first units to be palletized to register

4: set number of second units to be palletized to register

5: set position of delivery position of conveyor to positional register

6: set reference position of first pallet to positional register

7: set reference position of second pallet to positional register

8: set location of each unit in first layer from bottom on first pallet to positional register 9: set location of each unit in first layer from bottom on second pallet to positional register 10: set first passing point through which unit moved from delivery position of conveyor to first pallet passes, to positional register 11: set second passing point through which unit is moved from delivery position of conveyor to second pallet passes, to positional register 12: wait until one of unit arrival signals a1 and a2 turns on During waiting, the vision sensor is continuously activated. When each unit is conveyed to the delivery position of the conveyor, the vision sensor outputs the result of recognition of the unit and transmits unit arrival signal a1 or a2 to the robot according to the kind of the unit.

13: start palletizing operation for stacking first units on first pallet (when unit arrival signal a1 is on)

13': start palletizing operation for stacking second units on second pallet (when unit arrival signal a2 is on)

Hereinafter, the program regarding only the first unit is explained, since algorithms used for the first and second units may be substantially the same.

14: move robot to delivery position after reading positional register, and hold first unit Concretely, the robot moves the hand thereof to or near the center of the first unit, based on the size data of the first unit, so as to adsorb or grip the first unit. At this point, the robot checks whether the unit hold check signal is valid, and if the signal is invalid, the robot suspends the operation. In case that the suspension is due to an error, if the robot receives the above skip command signal, the unit handled when the error occurs is not counted and the robot restarts the operation.

15: move robot from delivery position to first passing point

16: calculate stacking position of unit using reference position of first pallet, number of layers of first units, position of each unit in selected stacking pattern, and current stacking sequence of units on first pallet 17: locate unit at stacking position by using robot 18: check whether stacking operation is completed by current stacking sequence on first pallet At this point, if the stacking operation on the first pallet is completed, pallet replacement command signal f1 is output. During replacement of the pallet, pallet replacing signal e1 is transmitted to the robot from external equipment. The robot waits until pallet replacing signal e1 turns off. Otherwise, if an unit to be moved to another pallet is conveyed to the delivery position, the robot picks the unit.

19: repeat above operations until a predetermined number of units are palletized In step S8, a simulation of the palletizing operation is executed in animation style, by using a palletizing program generated based on the above algorithm.

In the next step S9, the palletizing program is transmitted or downloaded to an actual robot or control device, whereby a teaching operation for the robot may be carried out.

Finally, in step S10, a running test of the actual system is carried out by using the downloaded palletizing program.

As described above, according to the present invention, the palletizing program may be generated and the operation of the program may be simulated, without using the actual robot in the field, whereby the operation of the actual robot required for generating the program may be reduces. Since all parameters may be set in a virtual space of the programming device, a time for generating the program may be shortened. Further, a cycle time of the palletizing program may be precisely determined, which is advantageous in designing a physical distribution system.

Hereinafter, a preferable modification of the invention is explained. A RF (radio frequency) tag may be attached to each unit, and a non-contact sensor 36 capable of reading the RF tag may be arranged near a stop position of the unit on the conveyor. The RF tag in this case is a package including an IC chip and an antenna, by which a short-range communication may be possible (i.e., data may be stored in or read from a semiconductor memory of the chip by using radio wave or an induced electromagnetic field). In the modification, information regarding the kind of each unit is stored in such a tag attached to the unit. Non-contact sensor 36 may read the information and transmit a signal indicating the information to the control device of the robot, whereby the kind of each unit may be recognized.

In case that the kind of the unit is switched at a certain period of time, a switching device 38 (schematically illustrated in FIG. 4) for the switching operation may be used as the recognition device. In this case, by previously preparing a robot program for switching the kind of the unit and transmitting a switching signal from switching device 38 to the control device of the robot system, the palletizing operation may be executed by category, according to the kinds of the units.

In case that the unit is a bundle of folded cardboards or a bundle of magazines which may be compressed when stacked, an amount of compression in each layer of the bundle may be calculated by measuring the height of the undermost layer when two layers are stacked and the height of the undermost layer when three layers are stacked. By using the amount of compression, the linear relation between the compressed height and the number of layers may be assumed and a robot program may be generated, by which the robot may picks the unit while adjusting the vertical position of each unit. As such, the robot program including a parameter regarding the amount of compression may be generated when the unit is compressible.

Instead of calculating the amount of compression of each layer, a vision sensor may be used for imaging the units in order to adjust the vertical position by reading the amount of compression from an obtained image, whereby the robot program including the parameter regarding the amount of compression may also be generated. In this case, it is preferable that the vision sensor is arranged for each pallet.

Alternatively, the vision sensor may be attached to the hand of the robot for reading the compressed height of the unit. When the sensor is configured to recognize the kind of the unit, assortment of the units may also be possible.

According to the robot programming device of the present invention, the operation of the actual system required for generating a palletizing program may be reduced, and a time for generating the program may be shortened.

By executing a simulation of the generated palletizing program, the occurrence of interference or the like may be checked without operating the actual system.

Further, by executing the simulation in animation style, the user may easily understand the simulation.

When the unit to be handled is compressible, a robot program including a parameter regarding the amount of compression of the unit may be generated.

The amount of compression may be easily measured by using a vision sensor.

Further, by attaching the vision sensor to the end of the robot, an installation space for the vision sensor may be reduced.

According to the present invention, concrete information of each component included in the palletizing system may be provided.

When a switching device for switching the kind of unit is used, the switching device may be used as a recognition device to recognize the kind of unit, whereby the system may be simplified.

Alternatively, when a RF tag is attached to the unit, a non-contact sensor for detecting the RF tag may be used as the recognition device.

Alternatively, by using a vision sensor as the recognition device, even when the number of kinds of the units may be increased, the kinds may be effectively recognized by changing settings of the vision sensor. In addition, if the vision sensor is no longer required to recognize the kind of the unit, the vision sensor may be used for another application.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A robot programming device for generating a palletizing program for use in a palletizing system including: a conveyor for conveying a plurality kinds of units, a vision sensor to recognize a kind of each unit conveyed by the conveyor based on the size thereof, a robot for assorting the units based on the kind of unit recognized by the vision sensor, and a plurality of pallets to which the assorted units are loaded according to the kinds of the units, the robot programming device comprising:
   a storing part for storing three-dimensional models of the plurality kinds of units, the conveyor, the vision sensor, the robot and the plurality of pallets;
   a layout making part for making a layout, in a virtual space, of the three-dimensional models stored in the storing part;
   a displaying part for displaying the layout made by the layout making part;
   an information setting part for setting information regarding each component displayed on the displaying part; and
   a program generating part for generating a palletizing program for the robot based on the layout of the three-dimensional models and the information set by the information setting part,
   wherein the palletizing program includes an algorithm for causing the vision sensor to output a result of recognition of each unit conveyed to a delivery position of the conveyor.

2. The robot programming device as set forth in claim 1, further comprising a simulation executing part for executing a simulation based on the palletizing program generated by the program generating part.

3. The robot programming device as set forth in claim 2, wherein the simulation is executed as a three-dimensional animation.

4. The robot programming device as set forth in claim 1, further comprising a compression amount calculating part for calculating an amount of compression of stacked units in the vertical direction,
   wherein the program generating part is configured to generate a program for automatically correcting the vertical position of the unit to be taken out.

5. The robot programming device as set forth in claim 1, wherein the information set by the information setting part includes at least one of: a kind of the unit detected by the vision sensor, a stacking pattern of the units on the pallet, input/output information between the robot, the conveyor and the vision sensor, and the shape and operational condition of a hand attached to the robot.

6. A robot programming device for generating a palletizing program used in a palletizing system including a conveyor for conveying a plurality kinds of units; a recognition device to recognize a kind of each unit conveyed by the conveyor; a robot for assorting the units based on the kind of unit recognized by the recognition device; and a plurality of pallets to which the assorted units are loaded according to the kinds of the units, the robot programming device comprising:
   a storing part for storing three-dimensional models of the plurality kinds of units, the conveyor, the recognition device, the robot and the plurality of pallets;
   a layout making part for making a layout, in a virtual space, of the three-dimensional models stored in the storing part;
   a displaying part for displaying the layout made by the layout making part;
   an information setting part for setting information regarding each component displayed on the displaying part;

a program generating part for generating a palletizing program for the robot based on the layout of the three-dimensional models and the information set by the information setting part; and a compression amount calculating part for calculating an amount of compression of stacked units in the vertical direction, wherein the program generating part generates a program for automatically correcting the vertical position of the unit to be taken out.

7. A robot programming device for generating a palletizing program used in a palletizing system including a conveyor for conveying a plurality kinds of units; a recognition device to recognize a kind of each unit conveyed by the conveyor; a robot for assorting the units based on the kind of unit recognized by the recognition device; and a plurality of pallets to which the assorted units are loaded according to the kinds of the units, the robot programming device comprising:

a storing part for storing three-dimensional models of the plurality kinds of units, the conveyor, the recognition device, the robot and the plurality of pallets;

a layout making part for making a layout, in a virtual space, of the three-dimensional models stored in the storing part;

a displaying part for displaying the layout made by the layout making part;

an information setting part for setting information regarding each component displayed on the displaying part;

a program generating part for generating a palletizing program for the robot based on the layout of the three-dimensional models and the information set by the information setting part; and a vision sensor for measuring an amount of compression of stacked units in the vertical direction, wherein the program generating part generates a program for automatically correcting the vertical position of the unit to be taken out.

8. The robot programming device as set forth in claim 7, wherein the vision sensor for measuring the amount of compression of stacked units is attached to a hand of a robot.

* * * * *